United States Patent [19]
Reichlinger

[11] Patent Number: 5,951,440
[45] Date of Patent: Sep. 14, 1999

[54] ENGINE CONTROLLER WITH OPERATOR INTERFACE

[76] Inventor: Gary Reichlinger, P.O. Box 4, York, Nebr. 68467

[21] Appl. No.: 09/097,028

[22] Filed: Jun. 12, 1998

[51] Int. Cl.⁶ .................................................. B60K 41/02
[52] U.S. Cl. ...................... 477/167; 123/179.2; 290/38 C
[58] Field of Search ................................. 477/167, 174, 477/179; 123/179.2, 179.4; 290/38 C

[56] References Cited

U.S. PATENT DOCUMENTS

| | | | |
|---|---|---|---|
| 2,015,309 | 9/1935 | Igarashi | 477/167 X |
| 3,514,621 | 5/1970 | Farmer et al. | 290/37 |
| 4,131,304 | 12/1978 | Wagner | 290/38 C |
| 4,296,334 | 10/1981 | Wong | 290/38 C X |
| 4,331,880 | 5/1982 | Dittman et al. | 290/38 R |
| 4,563,987 | 1/1986 | Geary et al. | 123/179 B |
| 4,577,599 | 3/1986 | Chmielewski | 123/179.2 |
| 5,072,703 | 12/1991 | Sutton | 123/179.4 |
| 5,619,412 | 4/1997 | Hapka | 364/424.045 |
| 5,662,553 | 9/1997 | Reichlinger | 477/179 |

*Primary Examiner*—Charles A Marmor
*Assistant Examiner*—Sherry Lynn Estremsky

[57] ABSTRACT

An engine controller provides for automatic starting of an internal combustion engine and engagement of a clutch to bring a driven load into motion. Automatic stopping and clutch disengagement is also provided. The engine controller is equipped with an operator interface which can be used by an operator to issue instructions to the controller. This operator interface can be implemented as a local keyboard display or as a remote communications link. The operator interface is also able to communicate changes in engine operating parameters so that starting performance can be improved and the engine can easily be adapted to different conditions and applications.

17 Claims, 2 Drawing Sheets

ENGINE CONTROLLER WITH OPERATOR INTERFACE

TECHNICAL FIELD

This present invention relates to interrelated power delivery controls, specifically control of a clutch and the starter of an internal combustion engine. More particularly, the invention relates to a controller for automatic starting of an engine and engagement of the clutch with the provision that instructions can be loaded and operating parameters can be changed through an operator interface.

BACKGROUND INFORMATION

The automatic starting and stopping of internal combustion engines is well established in the art. Electric current is applied to a starting motor to initiate the process until the engine starts or a period of time elapses. A number of methods have been used to detect when the engine has started based on parameters such as engine speed, oil pressure, starter motor current, engine vacuum, etc. If the engine does not start within the specified time, there is a delay and then the starting process is retried a designated number of times. While most of the prior art relates to starting engines for vehicles, some also relates to starting stationary engines equipped with clutches, as in U.S. Pat. No. 4,563,987. In this situation, the engine runs for a period of time after starting to warm it up and then the clutch is engaged to start the load in motion. Automatic stopping based on time or conditions such as low oil pressure is also well established in the art. The engine is stopped by grounding an ignition system or cutting off fuel to the engine.

Most prior art devices employ clutches which are controlled by the movement of a mechanical actuator. Centrifugal devices and electric motors have been specified to move this actuator. In addition, a broad range of motion control devices is known which could be used to meet this requirement. Microprocessors have come into use in a variety of motion control situations. Electromagnetic clutches are controlled by controlling the current going to the device. Other types of clutches use pneumatic or hydraulic control.

In most situations, an engine which is set up for automatic starting and clutch engagement will also have a means of controlling the operating speed of the engine. A common means of controlling engine speed is a mechanical governor which uses springs and flyweights to position a throttle to maintain a preset speed. This arrangement has the engine set at full throttle prior to the engine being started. Often a device such as a solenoid is employed to pull the throttle back, against the force of the governor springs, to a low speed idle position for starting and warmup. If such an idle control device is present, it is released prior to attempting to put the engine under load. After warmup, with or without an idle controller, the engine is then allowed to run at the governed speed at a low power setting, or governed idle speed, since no load has yet been applied. Another means of controlling the engine is an electronic governor. The electronic governor typically calculates speed by measuring the time between pulses from one of several known types of electronic sensors and adjusts the throttle position with an actuator to maintain a preset speed. Solenoids and stepper motors are often used as throttle actuators and a variety of methods are known for mounting them on engines and linking them to throttles. Also, electronic governors are used to control fuel injectors on engines so equipped. Many electronic governors operate using a PID algorithm. Such governors require calibration data to achieve their best performance. Engines controlled by any of these means are referred to as speed-governed engines.

It is desirable to have good starting performance for engines which use automatic starting devices. The time that the starter motor can run is limited by battery capacity in most cases. Also, there is usually a need to run unattended by an operator. These units might be located in remote areas such as on oil well pumping units. It has been generally recognized that engine starting performance can be optimized by appropriately setting the throttle position and fuel mixture. However, this will usually be in conflict with the settings forced by the operation of the speed governor as the starter cranking speed will be substantially below the speed set for engine operation.

As suggested above, there are many operating parameters needed to control or enhance the automatic starting of internal combustion engines. With most engines, setting the initial throttle position and fuel mixture to particular values will greatly enhance starting performance. Starter parameters include the length of time to run the starter motor in the absence of starting, the number of starter retries, and specific values of those engine parameters previously mentioned which relate to determining if a start has occurred. After starting, an idle speed must be set. A warmup time must be designated prior to the engaging of the clutch. Certain types of clutch controls, such as in U.S. Pat. No. 5,662,553, require parameters such as engagement speed or time intervals to be specified. Electronic governors need a target speed and sometimes additional calibration data. Some of the prior art devices thus have a number of switches and settings to accommodate the adjustment of some of these parameters. This can make operation of the device complicated and subject it to tampering by unauthorized persons. Others do not offer the opportunity to change the parameters from an initial setting which can reduce their adaptability and effectiveness.

A variety of operator interfaces are known. A keyboard combined with a display is the most common. This may be a computer-type keyboard with a video display or just a few switches and indicator lights. The operator interface can also be a communication link of some sort so that the operator is at a distance. A large variety of electrical connections and communications protocols are in use. Radio links may be used for intermediate or long distances. For communications over short distances, infrared pulses can be used. Standards for infrared communication have been published by the Infrared Data Association.

It has been recognized by numerous references, including U.S. Pat. No. 4,331,880, dating back many years that it would be desirable to run oil well pumping units powered by internal combustion engines on an intermittent basis. In spite of this, such devices have not come into general use. Intermittent operation is a widespread practice for wells powered by electricity.

SUMMARY OF THE INVENTION

This present invention provides an engine controller to automatically start an internal combustion engine and engage a clutch to bring the driven load into motion. An operator interface provides the capability to communicate instructions to the device such as starting and stopping times and conditions. Also, operating parameters can be changed through the operator interface to improve starting performance and to make the engine adaptable to varying applications and conditions. The operator interface can serve the additional function of returning diagnostic information from the engine controller back to the operator.

More specifically, a microprocessor controls the starter motor using transistors, relays, or other known control means to cause said starter motor to crank the engine. The starter motor is caused to run when a start instruction is received by the microprocessor through an operator interface or automatically at a previously designated time. Time is kept internally within the microprocessor or externally with known time-keeping means. The starter motor is released when known start-detection means indicate that the engine has started. Alternatively, if the engine does not start after a preset time period, the starter motor is released. This sequence is repeated a designated number of times until either the engine starts or a previously designated retry limit is reached. When the engine starts, it is run at a designated idle speed for a preset length of time until the engine has warmed up. Next, the microprocessor causes a clutch to engage. The manner in which the clutch control is achieved is dependent on the type of clutch employed. In the case of a mechanical clutch, the microprocessor is interfaced to mechanical motion control devices, pneumatic actuator controls, or hydraulic actuator controls. Electric clutches can be controlled somewhat more directly using transistors or relays. This invention also provides for the shut down of the engine upon the arrival of a designated time or upon the occurrence of a specified condition. This is achieved by the use of a transistor or relay to ground the ignition or by shutting off the fuel flowing to the engine. The clutch is disengaged by means appropriate to the type of clutch in use.

The operator interface can be a type of keyboard display mounted on the device or it can be a communications link so that the actual operator is at some distance from the unit. In one embodiment, data is transferred between the engine controller and a hand held keyboard display by infrared pulses. Another embodiment involves the use of radio frequency devices to communicate between the engine controller and a remote computer. Discrete instructions for the unit to perform immediately can be entered by the operator through the operator interface. These instructions would include codes telling the unit to start the engine, engage the clutch, stop the engine, etc. Also, codes corresponding to operating parameters can be communicated through the operator interface to be stored in memory within the engine controller. Typical operating parameters would include starting times, stopping times, starter cranking timeout, starter retry count, start detection data, and warmup time. The engine controller can be configured to implement the functions of fuel mixture control, speed governance, and clutch control or to interface with external devices which perform these functions. This makes it possible to use the operator interface to communicate additional operating parameters such as initial throttle position, initial fuel mixture setting, idle speed, clutch engagement data, operating speed, and governor calibration data to the controller.

Diagnostic data can be returned from the engine controller back to the operator through the operator interface. Such diagnostic data can include temperatures, electrical system voltages, oil pressure, and other engine performance data.

The term microprocessor is construed to encompass related computational units including microcontrollers, digital signal processors, application-specific integrated circuits, and other types of logic devices.

It is an objective of this invention to provide reliable unattended starting and stopping of engines and their driven loads. This is achieved by setting operating parameters to optimum values for the specific application and being able to easily change them when warranted. It is a further objective to facilitate intermittent operation of oil well pumping units which are powered by internal combustion engines. Another objective of this invention is to improve the ease of operation and security of unattended stationary engines.

DESCRIPTION OF THE PREFERRED EMBODIMENTS

Figure 1:
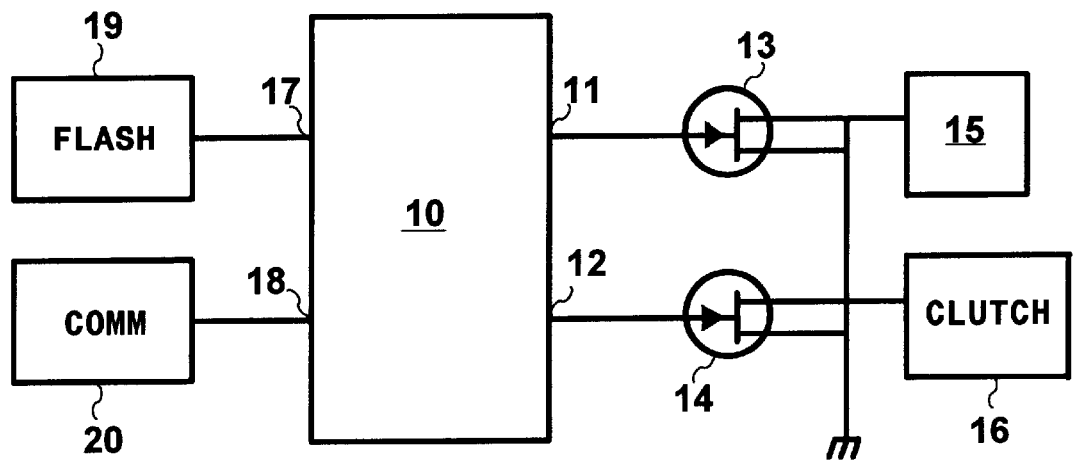
FIG. 1 is a simplified schematic drawing of an electronic circuit of an engine controller which can be used to practice the invention. Included in the circuit is a microcontroller which encompasses microprocessor and time-keeping means. Well-known microcontroller support circuits such as voltage regulators, reset control, timing crystals, circuit protection devices, and ground connections have been omitted for clarity.
Figure 2:
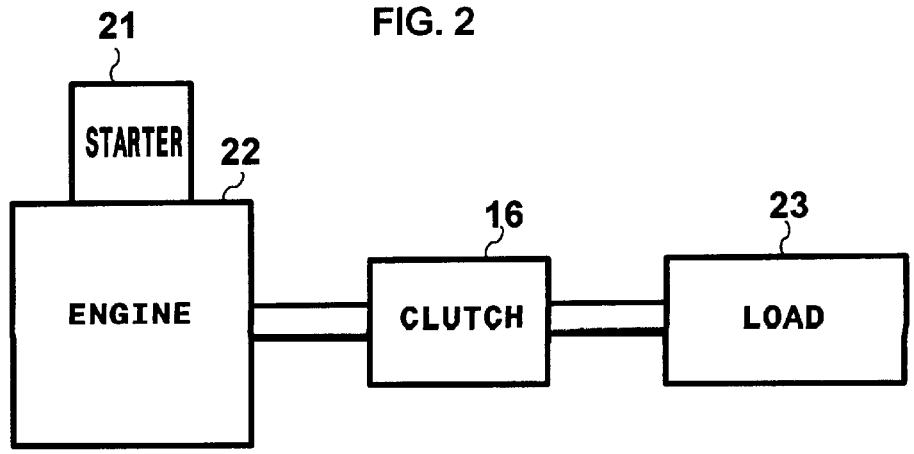
FIG. 2 illustrates the relationship between the principal mechanical elements of the invention.
Figure 3:
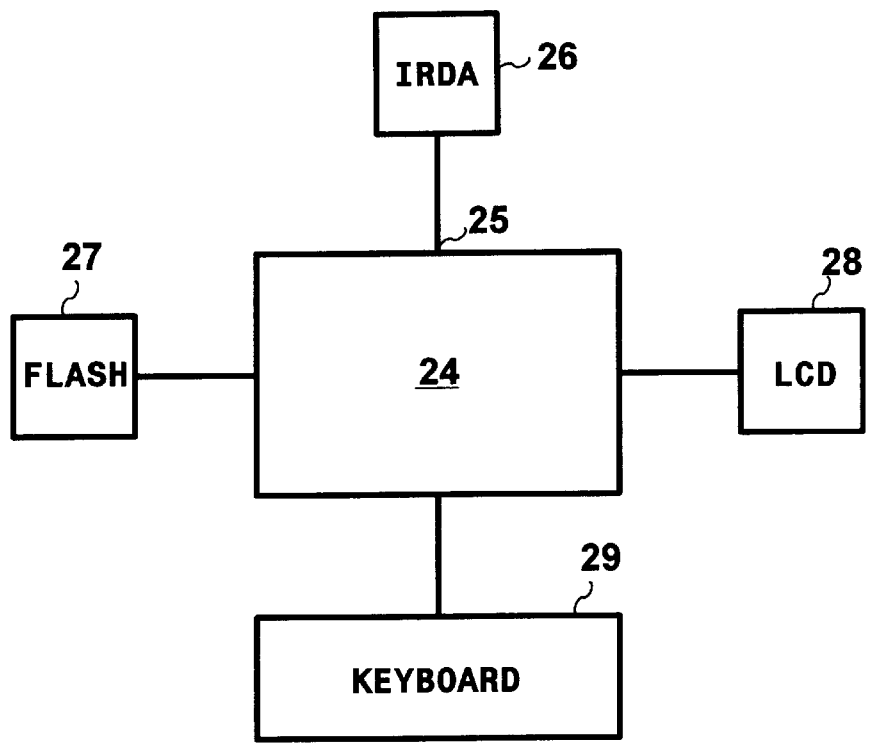
FIG. 3 is a block diagram of a hand held keyboard display device used in an embodiment of the invention.

Referring more particularly to the drawings, FIG. 1 discloses a microcontroller 10 with outputs 11 and 12. Outputs 11 and 12 connect to the gates of logic level N-channel mosfets 13 and 14 respectively, such that microcontroller 10 can control the on-off state of mosfets 13 and 14. An example of a component which would be suitable to be used for mosfets 13 and 14 is the International Rectifier IRLZ34N. The drain of mosfet 13 is connected to the low side of relay 15 such that when mosfet 13 is in the on state, relay 15 is energized. Relay 15, when active, applies current to a starter motor 21 (FIG. 2) which then cranks an internal combustion engine 22. The effect of this arrangement is that microcontroller 10 can control the operation of the starter 21 to facilitate the starting of the engine 22. The drain of mosfet 14 is connected to the low side of an electromagnetic clutch 16 such that current flows through the coil of the clutch 16 when mosfet 14 is in the on state. This circuit enables microcontroller 10 to control clutch 16 and to cause it to engage or disengage. In FIG. 2, it is indicated that clutch 16 is mechanically linked to engine 22 and to load 23 such that when it is engaged, load 24 is brought into motion from the power output of engine 22. FIG. 1 also discloses a memory component 19, preferably a non-volatile type such as flash, which is connected to microcontroller 10 by means of an interface 17. Also, a communication circuit 20 is connected to microcontroller 10 with an interface 18. The communications circuit 20 in one embodiment consists of an infrared transceiver and its supporting circuitry. FIG. 3 discloses a separate device with which in conjunction with the communications circuit 20 constitutes the operator interface in an embodiment of the invention. It is a hand held unit equipped with an infrared transceiver 26 which communicates with the communications circuit 20 of the engine controller depicted in FIG. 1. In this embodiment, both infrared transceiver 26 and communications circuit 20 are infrared transceivers compatible with the physical layer of the Infrared Data Association (IRDA) standard. The infrared transceiver 26 is connected to a microcontroller 24 (FIG. 3) by means of an interface 25. In addition, microcontroller 24 is interfaced to a memory component 27, an LCD display 28, and a keyboard 29. The types of interfaces used for these devices as well as the supporting software are well known to those skilled in the art of designing microcontroller-based products.

Infrared transceivers compatible with the IRDA physical layer standard are available from a number of suppliers including Hewlett Packard, Temic, Siemens, and Unitrode. A specific example of such a component would be the Hewlett Packard HSDL-1000. The suppliers of these components offer detailed data sheets with information on circuits which can be used to interface these chips to most currently available microcontrollers. Flash memory chips are available with serial and parallel interfaces from numerous sources. The serial interface components are somewhat easier to use with microcontrollers for data storage purposes. Examples of such parts include the Microchip Technology 25C320 which holds 4 k bytes of data and the Toshiba TC58A040F which holds nearly one megabyte of data. Either of these components can be interfaced to serial ports available on most microcontrollers.

Microcontrollers having at least one counter-timer device included within the component are available from numerous suppliers including Motorola, NEC, Intel, National Semiconductor, and Microchip Technology. It is an established practice to use these embedded devices with appropriate software to operate as time-keeping means. This includes time of day clocking as well as timing intervals as short as a few microseconds. The current invention employs a microcontroller, such as the NEC UPD78214, with this capability as microcontroller 10.

One mode of use of the operator interface is to enter discrete commands for the engine controller to execute immediately. A program running on microcontroller 24 displays a selection menu on display 28. The operator then enters a selection on keyboard 29 which is then sent to microcontroller 24. A program converts this data into a control code sequence which is transmitted through transceiver 26 to transceiver 20 on the engine controller (FIG. 1). The control code sequence is then received by microcontroller 10 through interface 18. A program running in microcontroller 10 determines an action to take based on the control code sequence received. If the code corresponded to starting the engine, the program would cause microcontroller 10 to set output 11 to high level causing the starter motor to run in the manner described above. Another code sequence would correspond to clutch engagement which would indicate that output 12 would be set high to engage the clutch. The time-keeping capability of microcontroller 10 can be utilized such that the levels of outputs 11 and 12 are sequenced to coordinate the starting and clutch engagement process. The duration of starter cranking without a start being achieved can be limited to a period of time such as 30 seconds. Similarly, the warmup time prior to clutch engagement can be preprogrammed.

The link between transceivers 20 and 26 could also be used to communicate operating parameters between the engine controller (FIG. 1) and the hand held unit (FIG. 3). Keyboard 29 can be used to enter selections which are converted to code sequences corresponding to operating parameters by a program running in microcontroller 24. These code sequences can then be transferred over the communications link. Alternatively, a block of code sequences which represents codes for all of the operating parameters used by the engine controller can be created by keyboard entries and then stored in memory component 27. This allows the block to be built at a convenient time away from the engine. The operating parameters can then be transmitted all at one time when the operator is at the engine site. This block of code sequences could also be created on a computer equipped with an infrared interface, loaded into the hand held unit through transceiver 26, and then stored in memory component 27 for later transfer to the engine controller. A number of operating parameters relating to the starting sequence would be transferred to the engine controller and stored in memory component 19. When the time-keeping means within microcontroller 10 indicates a time which matches the start time parameter, the automatic start sequence would begin. The starter 21 would be activated by microcontroller 10 in the manner previously described. It would crank engine 22 until it started or a time interval corresponding to a crank time parameter had elapsed. If starting was not achieved, the process would be retried a number of times corresponding to a retry parameter. After the engine started, it would idle for a period of time corresponding to an idle time parameter. At that point, the clutch 16 would be engaged to start load 23 into motion.

The operator interface and memory component 19 could also be used to transfer and store operating parameters relating to start detection. When the starter is engaged and drawing current from the battery, the system voltage is drawn down. When the engine starts, the current draw of the starter motor is greatly reduced and the system voltage increases. A voltage parameter can thus be designated which corresponds to the desired point of starter release. Many microcontrollers have an analog to digital converter feature which can be used to measure voltages. A voltage divider with suitable resistors can be used to reduce the system voltage down to the range which can be measured by the analog to digital converter, commonly zero to 5 volts. It is advisable to also designate a minimum start time when using this method. Sometimes there may be some bounce in the starter relay 15 when could falsely trigger this start detection method. A value of a half second is usually sufficient for this purpose. The operator interface allows easy changing of the starter release voltage parameter to adjust to conditions such as seasonal temperature variations or changes in battery condition.

An established practice for achieving engine shutdown is to ground the ignition. This is usually done with a relay or transistor. It can be done with a microcontroller output controlling a mosfet as is used for the starter and clutch control. Some engines employ an ignition system in which the ignition pulse goes below ground. In these instances, an additional mosfet driver component may be required such as an International Rectifier PVI5050. Automatic engine shutdown occurs when the current time matches a shutdown time parameter. Also, with appropriate sensors interfaced to microcontroller 10, conditions such as low oil pressure or excessive engine temperature can be programmed to activate the shutdown circuit. Pressure transducers capable of interfacing to microcontroller analog to digital converters are available from Motorola, Data Instruments, Setra, Kavlico, and others. Temperature sensors with similar capability are available from National Semiconductor and Analog Devices.

Starting performance can be enhanced by using the operator interface to transfer operating parameters to other engine control devices such as speed governors and fuel mixture controllers. The functions of these control devices can be implemented within microcontroller 10 or as separate devices which are interfaced to microcontroller 10. The use of a microcontroller to implement an engine speed governor is a known application. With regard to the starting process, the interest is in setting the engine controls actuated by the governor to positions which are most conducive to starting the engine. Operating parameters such as initial throttle position, fuel injection rate, and idle speed would be set for optimum values for starting and warmup. These values could be changed through the operator interface when necessary. The operator interface could also be used for designating operating parameters for governed speed and PID calibration data. Data required by the implementation of a specialized clutch control, such as that disclosed in U.S. Pat. No. 5,662,553, could be transferred over the operator interface.

Since the communications link between transceiver 20 (FIG. 1) and transceiver 26 (FIG. 3) is bidirectional, it is also possible to transfer data back to the hand held unit from the engine controller. Status codes indicating number of retries on starting attempts, reasons for automatic shutdowns, and times of previous start and stop operations would provide useful information to the operator. Also, engine diagnostic data such as current system voltage, voltage during previous start attempt, oil pressure, temperature, and operating speed could be provided if corresponding sensors were interfaced to microcontroller 10.

Figure 4:
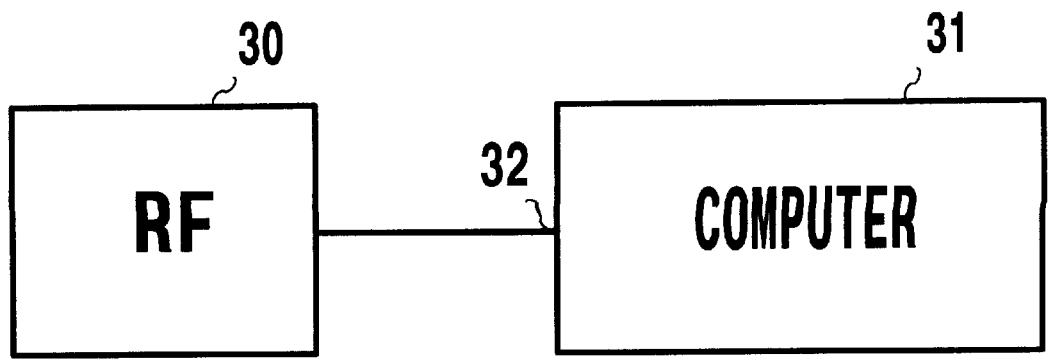
FIG. 4 is a block diagram of a computer and radio frequency communications device used in an embodiment of the invention.

In another embodiment of the invention, radio frequency devices are used rather than the infrared transceivers. In this embodiment, communications circuit 20 (FIG. 1) is an RF modem. It is connected to microcontroller 10 with an interface 18. It communicates with another RF modem 30 (FIG. 4) which is connected to a computer 31 through an interface 32. The computer 31 then performs the same functions as the hand held unit depicted in FIG. 3. Except for the type of communications employed, the engine controller would function in the same manner as in the first embodiment. The use of RF communications provides the opportunity to monitor and control the engine from a much greater distance than is possible with the infrared transceivers. It is also possible to equip the engine controller with both types of communications devices since a hand held unit may be more convenient when the operator goes to the engine site while the radio link is used from a base station. Alternatively, computer 31 could be a portable device and it could then be used for both purposes.

I claim:

1. An engine controller for an internal combustion engine, which engine is connected to a load by means of a clutch, comprising:

a starter control means to activate and deactivate a starter of the engine;

a clutch control means to engage and disengage the clutch;

an operator interface;

a time-keeping means;

memory means to store representations of instructions and operating parameters;

a microprocessor to connect to the operator interface to receive instructions and operating parameters to be applied to the starter control means and the clutch control means, which microprocessor utilizes the time-keeping means to apply said instructions at designated times.

2. An engine controller according to claim 1 wherein the operator interface is implemented through the use of infrared communications devices capable of transferring instructions and operating parameters between an engine control unit and a hand held unit, which hand held unit comprises data entry means, data display means, and memory means.

3. An engine controller according to claim 1 wherein the operator interface is implemented through the use of radio frequency communications devices capable of transferring instructions and operating parameters between an engine control unit and a computer.

4. An engine controller according to claim 1 wherein the operating parameters include data designated for use by a clutch control device.

5. An engine controller according to claim 1 wherein the operating parameters include data designated for use by an engine speed governing device.

6. An engine controller according to claim 1 wherein the operating parameters include data designated for use by a fuel mixture control device.

7. An engine controller according to claim 1 wherein the operator interface is used to transfer engine diagnostic data.

8. An engine controller according to claim 1 with means for stopping the engine.

9. An engine controller for a speed-governed internal combustion engine, which engine is connected to a load by means of a clutch, comprising:

a starter control means to activate and deactivate a starter of the engine;

a means to control the speed governor of the engine;

a clutch control means to engage and disengage the clutch;

an operator interface;

a time-keeping means;

memory means to store representations of instructions and operating parameters;

a microprocessor to connect to the operator interface to receive instructions and operating parameters to be applied to the starter control means, the speed governor control means, and the clutch control means, which microprocessor utilizes the time-keeping means to apply said instructions at designated times.

10. An engine controller according to claim 9 wherein the operator interface is implemented through the use of infrared communications devices capable of transferring instructions and operating parameters between an engine control unit and a hand held unit, which hand held unit comprises data entry means, data display means, and memory means.

11. An engine controller according to claim 9 wherein the operator interface is implemented through the use of radio frequency communications devices capable of transferring instructions and operating parameters between an engine control unit and a computer.

12. An engine controller according to claim 9 wherein the operating parameters include data designated for use by a clutch control device.

13. An engine controller according to claim 9 wherein the operating parameters include data designated for use by an engine speed governing device.

14. An engine controller according to claim 9 wherein the operating parameters include data designated for use by a fuel mixture control device.

15. An engine controller according to claim 9 wherein the operator interface is used to transfer engine diagnostic data.

16. An engine controller according to claim 9 with means for stopping the engine.

17. An engine controller for an internal combustion engine, which engine is connected to a load by means of a clutch, comprising:

a starter control means to activate and deactivate a starter of the engine;

a clutch control means to engage and disengage the clutch;

an operator interface;

a time-keeping means;

memory means to store representations of instructions and operating parameters;

a microprocessor to connect to the operator interface to receive instructions and operating parameters to be applied to the starter control means and the clutch control means beginning at the time of receipt of said instructions by the microprocessor.

* * * * *